(12) United States Patent
Kohlmann et al.

(10) Patent No.: US 8,441,972 B2
(45) Date of Patent: *May 14, 2013

(54) WCDMA DEVICE AND METHOD FOR DISCONTINUOUS RECEPTION FOR POWER SAVING IN IDLE MODE AND FLEXIBLE MONITORING OF NEIGHBORING CELLS

(75) Inventors: Michael Kohlmann, San Francisco, CA (US); Tae Hea Nahm, Los Altos, CA (US); Beomsup Kim, Cupertino, CA (US); Cormac Conroy, Campbell, CA (US)

(73) Assignee: QUALCOMM Incorporated, San Diego, CA (US)

( * ) Notice: Subject to any disclaimer, the term of this patent is extended or adjusted under 35 U.S.C. 154(b) by 626 days.

This patent is subject to a terminal disclaimer.

(21) Appl. No.: 11/280,524

(22) Filed: Nov. 16, 2005

(65) Prior Publication Data

US 2007/0109987 A1 May 17, 2007

(51) Int. Cl.
*G08C 17/00* (2006.01)
(52) U.S. Cl.
USPC ........ 370/311; 370/310.1; 370/315; 370/318; 455/343.1; 455/572; 455/574; 455/41.2; 455/556.2; 713/320; 713/321; 713/323; 713/330
(58) Field of Classification Search .................. 370/311, 370/310.1, 315, 318, 320; 455/343.1–343.5, 455/572, 574, 41.2, 41.3, 556.2, 557, 552.1, 455/553.1; 713/320–321, 323, 330
See application file for complete search history.

(56) References Cited

U.S. PATENT DOCUMENTS

| | | | |
|---|---|---|---|
| 5,291,542 A | 3/1994 | Kivari et al. | 379/58 |
| 5,568,513 A | 10/1996 | Croft et al. | 375/224 |
| 5,570,369 A | 10/1996 | Jokinen | 370/95.3 |
| 5,701,329 A | 12/1997 | Croft et al. | 375/224 |
| 5,715,278 A | 2/1998 | Croft et al. | 375/224 |
| 5,752,201 A | 5/1998 | Kivari | 455/574 |
| 5,890,005 A | 3/1999 | Lindholm | 395/750.03 |
| 5,905,943 A | 5/1999 | Wiedeman et al. | 455/11.1 |
| 5,983,116 A | 11/1999 | Nash et al. | 455/550 |
| 6,041,241 A | 3/2000 | Willey | 455/574 |
| 6,125,260 A | 9/2000 | Wiedeman et al. | 455/11.1 |
| 6,219,564 B1 | 4/2001 | Grayson et al. | 455/574 |
| 6,356,538 B1 | 3/2002 | Li | 370/311 |
| 6,356,595 B1 | 3/2002 | Czaja et al. | 375/262 |
| 6,526,295 B1 | 2/2003 | Shull | 455/574 |
| 6,625,467 B2 * | 9/2003 | New et al. | 455/525 |
| 6,639,905 B1 | 10/2003 | Muller et al. | 370/336 |
| 6,690,652 B1 | 2/2004 | Sadri | 370/252 |
| 6,741,836 B2 | 5/2004 | Lee et al. | 455/41.2 |
| 6,944,210 B1 | 9/2005 | Michel et al. | 375/150 |
| 7,006,824 B1 * | 2/2006 | Tse et al. | 455/423 |
| 8,243,640 B2 | 8/2012 | Kohlmann et al. | |
| 2003/0133337 A1 | 7/2003 | Yamada et al. | |
| 2003/0224793 A1 * | 12/2003 | Bonta et al. | 455/445 |

(Continued)

*Primary Examiner* — Nimesh Patel
(74) *Attorney, Agent, or Firm* — Kevin T. Cheatham (57) ABSTRACT

A WCDMA enabled user equipment device configured to have functions collectively or selectively idle to conserve power. A discontinuous receiver is used to detect and read network messages and report the messages to the host processor within the WCDMA enabled user equipment device. The host processor then activates functions previously powered down to receive incoming messages for the user of the WCDMA device. The discontinuous receiver is also used when the WCDMA device is active to read network messages, freeing a modem of the device to operate on user messaging; and therefore, enhancing user related performance.

8 Claims, 10 Drawing Sheets

U.S. PATENT DOCUMENTS

| | | | |
|---|---|---|---|
| 2004/0077326 A1* | 4/2004 | Shi | 455/313 |
| 2004/0198302 A1* | 10/2004 | Hutchison et al. | 455/343.1 |
| 2006/0262739 A1* | 11/2006 | Ramirez et al. | 370/311 |
| 2007/0064662 A1* | 3/2007 | Bultan et al. | 370/338 |
| 2007/0109987 A1* | 5/2007 | Kohlmann et al. | 370/318 |
| 2007/0223599 A1* | 9/2007 | Sheng et al. | 375/259 |
| 2008/0219199 A1 | 9/2008 | Kohlmann et al. | |
| 2008/0219200 A1 | 9/2008 | Kohlmann et al. | |

* cited by examiner

WCDMA DEVICE AND METHOD FOR DISCONTINUOUS RECEPTION FOR POWER SAVING IN IDLE MODE AND FLEXIBLE MONITORING OF NEIGHBORING CELLS

BACKGROUND OF THE INVENTION

1. Field of Invention

The present invention is related to mobile phones and in particular power saving for mobile phones comprising wideband code division multiple access.

2. Description of Related Art

WCDMA (Wideband Code Division Multiple Access) has become a third generation standard for mobile communications. The WCDMA replaces the GSM (Global System for Mobile Communications) a second generation standard, which is oriented to voice communications with limited data capability. The demand by users for not only voice communications but also Web browsing, downloading E-mail, and sending pictures has placed a demand for higher data rate capability. The WCDMA standard provides a spectrum with a 5 MHz carrier, which provides approximately a fifty times higher data rate than the second generation GSM technology. Along with the higher data rate capability come the need to use more power and in turn the need to have power savings to moderate the demand on the battery life of a mobile or cellular phone.

There are numerous power saving techniques that have been developed for first and second generation mobile phones. In U.S. Pat. No. 6,944,210 B1 (Michel et al.) a method is directed to receiving or transmitting messages wherein the use of spreading codes for CDMA signals provides for power saving measures. U.S. Pat. No. 6,741,836 B2 (Lee et al.) is directed to a dual mode Bluetooth/wireless mobile unit wherein a sleep mode a wakeup time is rescheduled to synchronize with any upcoming idle mode wireless wakeup time that will precede the Bluetooth wakeup time. U.S. Pat. No. 6,690,652 B1 (Sadri) is directed to a WCDMA system which includes a base station transmitter and a pilot channel that transmits control signals between the base station and the mobile station.

In U.S. Pat. No. 6,639,905 B1 (Muller et al.) a transmitter is directed to controlling at least one receiver by intermittently transmitting groups of messages and increasing the efficiency of transmitted control messages without markedly increasing power consumption of transceivers in the radio frequency network. U.S. Pat. No. 6,526,295 B1 (Shull) is directed to a power saving method comprising the delay of the turning on of a local oscillator in a mobile phone while the processor of the mobile phone sorts through a previously received neighbor list and includes a method for generating compensation factors for use in power savings. U.S. Pat. No. 6,356,595 (Czaja et al.) is directed to a method that affords low error rate and allows for improved power conservation by a mobile station. U.S. Pat. No. 6,356,538 B1 (Li) is directed to a system for operating a wireless communications device in a manner that significantly reduces power consumption of the device.

In U.S. Pat. No. 6,219,564 (Grayson et al.) a digital mobile communication station is directed to a high frequency time base circuit that shuts down for a predetermined period for power saving purposes. U.S. Pat. No. 6,125,260 (Wiedeman et al.) is directed to a radio frequency map that can be used to reallocate frequency channels of operation and resulting in power savings in a mobile phone while maintaining a suitable signal-to-noise ratio. U.S. Pat. No. 6,041,241 (Willey) is directed to an apparatus and method for balancing power savings and call setup time for a wireless communications device. U.S. Pat. No. 5,983,116 (Nash et al.) is directed to a radio telephone having an analog key signal output for power conservation. U.S. Pat. No. 5,905,943 (Wiedman et al) is directed to the use of a radio frequency map to reallocate frequency channels resulting power savings in a mobile phone. In U.S. Pat. No. 5,890,005 (Lindholm) a method is directed to reducing power consumption in an electronic system such as a wireless or cellular phone. U.S. Pat. No. 5,752,201 (Kivari) is directed to a cellular communication device that includes a controller which places the user terminal in a powered down state for a period of time depending upon the number of filler messages.

In U.S. Pat. No. 5,715,278 (Croft et al.) a method is directed to an apparatus for reducing standby power in a mobile phone while simultaneously increasing the probability of receiving the intended message. U.S. Pat. No. 5,701,329 (Croft et al.) is directed to a power saving standby mode that can be used in mobile radio stations operating in current networks and improving the intended message reception. In U.S. Pat. No. 5,570,369 (Jokinen) a method is directed to reducing power consumption in a mobile phone system wherein a broadcasted message is reconstructed from a partial signal from a base station. U.S. Pat. No. 5,568,513 (Croft et al.) is directed to a power saving standby mode that can be used in mobile radio stations using a CRC check to determine when to be on the power saving mode. U.S. Pat. No. 5,291,542 (Kivari et al.) is directed to a circuit arrangement for a mobile phone comprising a microprocessor that is responsive to a clock signal, which leads to reduced power consumption.

Figure 1:
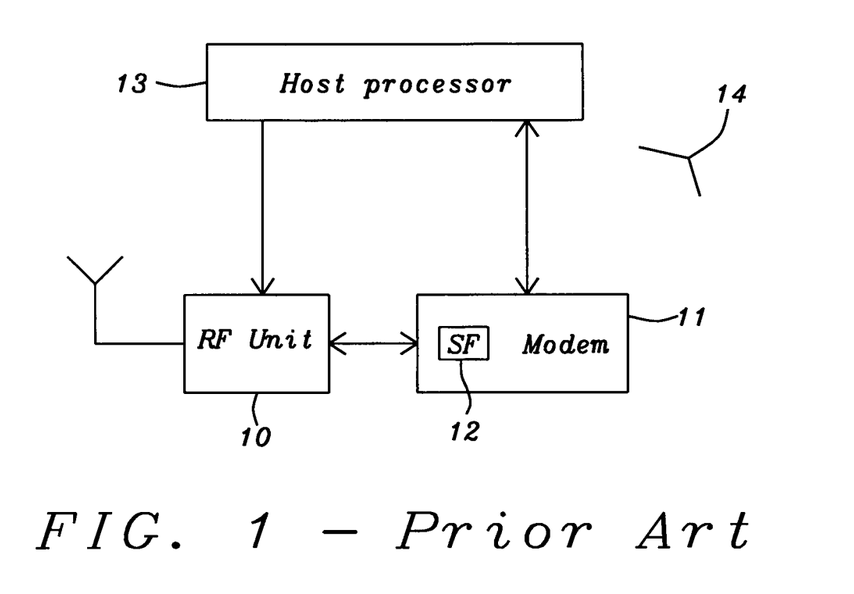
FIG. 1 is a block diagram of a WCDMA mobile phone of prior art.

In FIG. 1 is shown a block diagram of a WCDMA device of prior art. An RF unit 10 couples signals to and from a modem unit 11. A search function 12 is contained within the modem unit 11 to search the spread of an incoming base band data over approximately a 5 MHz band. A host processor 13 sets up and controls the modem and RF units. Data, such as Internet, text and pictures, received by the modem 11 is coupled to the host processor 13 for display on a screen of a mobile phone 14. Data, such as internet text and pictures, generated by the mobile phone 14 are coupled to the modem for transmission by the RF unit. A power management scheme is needed for the mobile phone 14 to allow the reception of signals while at the same time preserving battery power life. The modem 11 amongst other features provide a heavy drain of power from the batteries of the mobile phone.

SUMMARY OF THE INVENTION

It is an objective of the present invention to minimize use of power supplied by batteries through conservation techniques in a WCDMA device, where the WCDMA device is user equipment enabled by WCDMA technology comprising a mobile phone device, a PDA (personal data assistant), and PCI (peripheral component interconnect) cards or any other WCDMA enabled communication device.

It is also an objective of the present invention to use discontinuous reception to minimize the time that functions of a WCDMA device are active to receive signals and in turn reduce the demand for power.

It is also further an objective of the present invention to use a paging occasion timed by internal counters of a WCDMA device to wake up portions of the WCDMA device to look for incoming messages.

It is still an objective of the present invention to configure functions of a WCDMA device to allow major portions of the WCDMA device to be in a sleep or partial active mode while monitoring signaling activity or by periodically providing a paging occasion to detect possible incoming messages and when detected, activating functions sleeping or in a partial active state to receive a message.

It is still further an objective of the present invention to monitor network messaging without the use of a modem of the WCDMA device and allowing the modem and other major functions of the WCDMA device to be powered down to conserve power.

It is still yet an objective of the present invention to monitor and read network messages without the use of the modem of the WCDMA device to enhance the performance of user messaging in the WCDMA device.

In the present invention a DRX (Discontinuous Receiver) unit is used to detect network messages, for example PICH (paging indicator channel) signals, and when the modem DSP (digital signal processor) is asleep, demodulate S-CCPCH (secondary common control physical channel) signals. The use of the DRX allows major functions of the WCDMA device, which is user equipment enabled by WCDMA technology comprising a mobile phone, a PDA and PCI cards or any other WCDMA enabled communication device, to be powered down in a sleep mode to conserve power. The DRX also enhances performance of the WCDMA device in active state by reading network messages, free the modem from reading these messages and enhancing the performance of the WCDMA device on user messaging. After demodulating S-CCPCH signals the DRX wakes up the host processor contained within the WCDMA device and hands over a paging message to the host processor.

The DRX contains a search engine, similar to that contained within the modem function of the WCDMA device and is used when the modem DSP (digital signal processor) of the WCDMA device is asleep. The search engine detects portions of an incoming signal that has been spread over a several mega hertz of signal bandwidth, which has been done to improve messaging bandwidth to accommodate the Internet and large data messaging such as transmission of pictures.

In the present invention the DRX unit monitors signals (digital IQ data) from the RFTRX (radio frequency transmit and receive) unit. The digital IQ data is two data streams, I=In phase data modulated to the cosine component of the signal carrier and Q=Quadrature data modulated to the sine component of the signal carrier. The DRX reports signal events to the host processor of the WCDMA device and is set up by the host processor to detect various network signals that are broadcast by a base station of the network. The various modes disclosed in the present invention are all directed to saving power drain on the batteries of the WCDMA device and extending the time between charging of the batteries.

The DRX unit is also used to monitor cells that are near the cell within which a WCDMA device operates. To perform cell monitoring, the environment is monitored to determine which cells are within reach by the WCDMA device signals using a search function that is located in the DRX unit as well as in the modem of the WCDMA device. Discontinuous activities of the WCDMA device to conserve the use of battery power necessitates the use of "snapshots" of the environment which is similar to monitor of the paging channel but does not require the demodulation of a PICH signal.

BRIEF DESCRIPTION OF THE DRAWINGS

This invention will be described with reference to the accompanying drawings, wherein.

DETAILED DESCRIPTION OF THE PREFERRED EMBODIMENT

Figure 2:
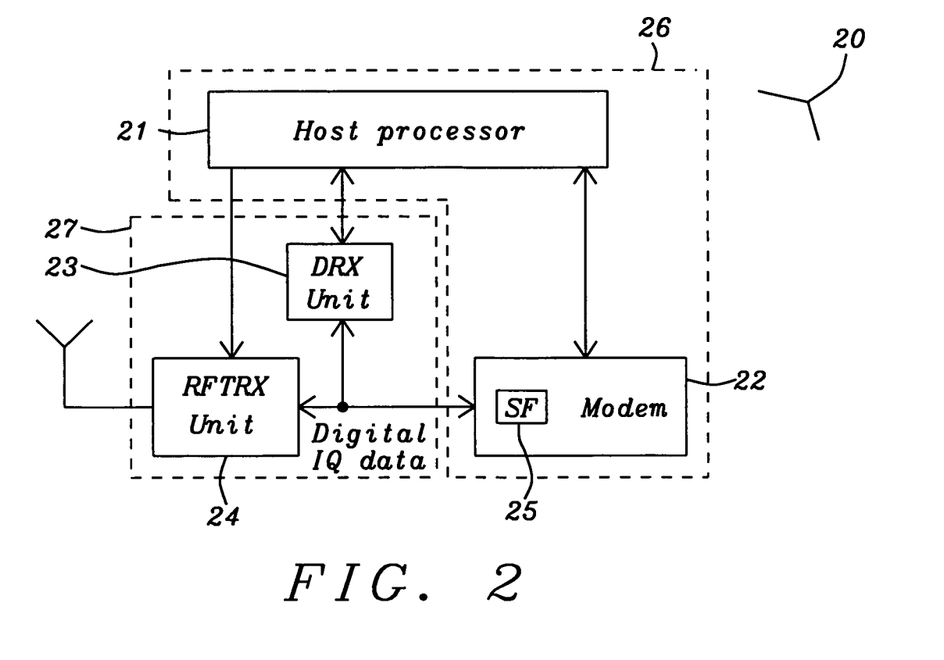
FIG. 2 is a block diagram of a WCDMA device of the present invention.

In FIG. 2 is shown a block diagram of a WCDMA device 20 of the present invention, where the WCDMA device is enabled user equipment comprising a mobile phone, a PDA and PCI cards. A host processor 21 is coupled to a modem unit 22, a DRX (discontinuous receiver) unit 23 and an RFTRX (RF transmit and receive) unit 24. The RFTRX unit 24 is coupled to the modem unit 22 and the DRX unit 23 providing digital IQ data to the modem and the DRX unit. The IQ data provides two data streams "I" and "Q" where I="In phase" which is modulated to the cosine component of carrier signal and Q="Quadrature phase", which is modulated to the sine component of the carrier signal. Contained within the modem unit 25 is a search function 25 that is used to detect portions of an incoming signal that has been spread over a several mega hertz of signal bandwidth to improve messaging bandwidth to accommodate the Internet and large data messaging such as transmission of pictures. The host processor 21 and the modem unit 22 are preferred to be integrated together on the same semiconductor device 26; although, separate devices can be used for the host processor and the modem unit. In like manner the RFTRX unit 24 and the DRX unit 23 are preferred to be integrated together on the same semiconductor device 27; although the RFTRX unit and the DRX unit can be located on separate semiconductor devices.

Continuing to refer to FIG. 2, the host processor 21 controls and configures the peripheral units comprising the modem unit 22, the RFTRX unit 24 and the DRX unit 23 to perform in various power saving modes, where the host processor and the peripheral units can be in an active state or various low power standby modes in an idle state, comprising a sleep state and a partially active state. When in a sleep state a particular function is powered down and provides no functional response. In the partially active state a particular function is partially powered down leaving critical elements active to perform critical operations of receiving and sensing incoming signals and reporting results to other functional units, for example the host processor.

Continuing to refer to FIG. 2, in a first embodiment of the present invention a discontinuous reception of the PICH (paging indicator channel) signals in idle mode is performed. The WCDMA device 20 is powered up, and the host processor and the peripheral units comprising the RFTRX 24, the modem 22 and the DRX 23 are turned on to obtain system information and register with the cellular network. The RFTRX 24, modem 22 and the DRX 23 are set into an idle mode in which each of the peripheral units return to a partial active state. A paging occasion created by internal timers within the host processor 21 activates the peripheral units by activating the RFTRX 24, modem, 22 and the DRX 23. A paging occasion defines the radio frame ID (identification) at which the Paging Indicator Channel (PICH) carries the Paging Indicator Bit for the WCDMA device of interest. The PICH is the paging indicator channel, which is a common channel that carries the paging indicator bits for all WCDMA devices in a cell. The timing of the paging indicator bit for a specific WCDMA device is given by the paging occasion that defines the radio frame ID, and the ID of the paging indicator bit defines the relative timing within a radio frame. A Paging Indicator Bit is used to notify a specific WCDMA device or a group of WCDMA devices about the transmission of a paging message by the network for the WCDMA device or the group of WCDMA devices.

Continuing to refer to FIG. 2, the search function 25 within the modem 22 reports to the host processor 21 the detection of portions of an incoming message that has been spread over a several mega hertz of signal bandwidth. The host processor 21 configures the DRX 23 to detect PICH (paging indicator channel) signals and in turn the DRX notifies the host processor of a paging bit, whereupon the host processor activates (wakes up) the modem to demodulate S-CCPCH (secondary common control physical channel) signals and report the paging message to the host processor. The S-CCPCH carries the paging messages transmitted by the network. Upon detection of a positive Paging Indicator received on the PICH, the WCDMA device receives the associated S-CCPCH frame that carries a paging message.

Continuing to refer to FIG. 2, in the first embodiment the DRX unit 23 does not require an internal search engine since the host processor 21 provides synchronization of the DRX unit based on the modem search report from the search function 25 The host processor is in a low power standby mode (partially active in terms of power consumption) to provide control to the modem 22 and the DRX unit 23. The RFTRX 24, DRX 23 and the modem 22 are partially active in terms of duty cycle and become fully active during a paging occasion.

Continuing to refer to FIG. 2, in a second embodiment of the present invention the functions of a WCDMA device are in idle mode where the DRX unit 23 operates autonomously and contains internal timing and a search engine to perform a search function to perform the detection of incoming network messages. The WCDMA device is powered up, activating the host processor 21, the RFTRX unit 24, the DRX unit 23 and the modem 22. The host processor configures the DRX unit 23 to detect PICH and S-CCPCH signals.

Continuing to refer to FIG. 2, in a third embodiment of the present invention a discontinuous reception of a PICH signal is performed in an idle mode. The WCDMA device 20 is powered up and the host processor 21, the RFTRX unit 24, the DRX unit 23 and the modem 22 are active to obtain system information and register with the cellular network. The RFTRX unit 24 and the DRX unit 23 enter a partial active mode and the modem 22 goes to a sleep state after registration is completed. Upon a paging occasion the host processor 21 awakens the RFTRX unit 24 and the DRX unit 23. The RFTRX unit and the DRX unit are in partially active state and are only fully active during the paging occasion.

Continuing to refer to FIG. 2, in a fourth embodiment of the present invention the WCDMA device 20 performs cell monitoring in an idle mode. The WCDMA device 20 is powered up and the host processor 21, the RFTRX unit 24, the DRX unit 23 and the modem 22 are active to obtain system information and the register with the cellular network. The RFTRX unit 24 and the DRX unit 23 enter a partial active mode and the modem 22 goes back to a sleep state after registration is completed. The software running on the host processor manages the monitoring of a cell. The host processor uses an internal timer by which the software triggers monitoring events. The frequency of the cell monitoring depends on the software that is running on the host processor and the environment in which the WCDMA device is moving as the WCDMA device changes location.

Continuing to refer to FIG. 2, in a fifth embodiment of the present invention the WCDMA device 20 performs cell monitoring in a connected mode, for example talking on a WCDMA device. The WCDMA device 20 is powered up and the host processor 21, the RFTRX unit 24 and the modem 22 are active. The DRX unit 23 is partially active and does not read the PICH signal since the WCDMA device 20 is already active. The host processor 21 manages the peripheral units (RFTRX 24, DRX 23 and the modem 22). In the advent of a cell monitoring event the host processor 21 activates the DRX unit 23 to monitor candidate cells. Candidate cells are those cells to which the WCDMA device can perform a handover to maintain adequate signal strength. If the WCDMA device keeps changing its location, the signal from one or more active cell that are currently exchanging user data with the WCDMA device will eventually get weak. In order to maintain connection with the network (e.g. to avoid dropping a call) the WCDMA device constantly needs to promote previously identified candidate cells (upon negotiation with the network) into its set of active cells. If required the host processor 21 configures the RFTRX unit 24 to receive an active carrier while monitoring other carriers in a compressed mode. The overall WCDMA receive bandwidth (e.g. 60 MHz wide) is divided into segments of 5 MHz (e.g. 12 segments). One segment is called carrier A network operator may transmit on one or multiple carriers. The active carrier is a carrier selected by the network to exchange data with the WCDMA device. The control software running on the host processor negotiates with the network which carrier to select as the active carrier.

Monitoring other carriers is required for the same reason as monitoring other cells in order to maintain connection to the network when changing the location. Compressed mode is required if carriers other than the one currently used for exchange of user data (active carrier) is subject to monitoring. During compressed mode the network interrupts transmission of data at the active carrier for a defined time (compressed gap) to allow the WCDMA device to tune its receiver to another carrier for measurements. This process is initiated upon signaling from the network.

The host processor 21 then configures the DRX unit 23 to search on P-CPICH (primary common pilot indicator) and complements the overall search capacity of the WCDMA device 20 in connected mode using a search engine within the DRX unit. The P-CPICH is used by the network for transmission of a predefined pilot signal (pilot bit sequence know by the WCDMA device a priori) to facilitate synchronization of the WCDMA device receiver. Since the WCDMA device knows exactly what bit sequence to expect on the PCPICH, the WCDMA device can correlate the received signal with the expected sequence and thus determine the exact timing of the received signal (including detection of resolvable propagation paths, which look like delayed versions of the transmitted bit sequence).

Figure 3A:
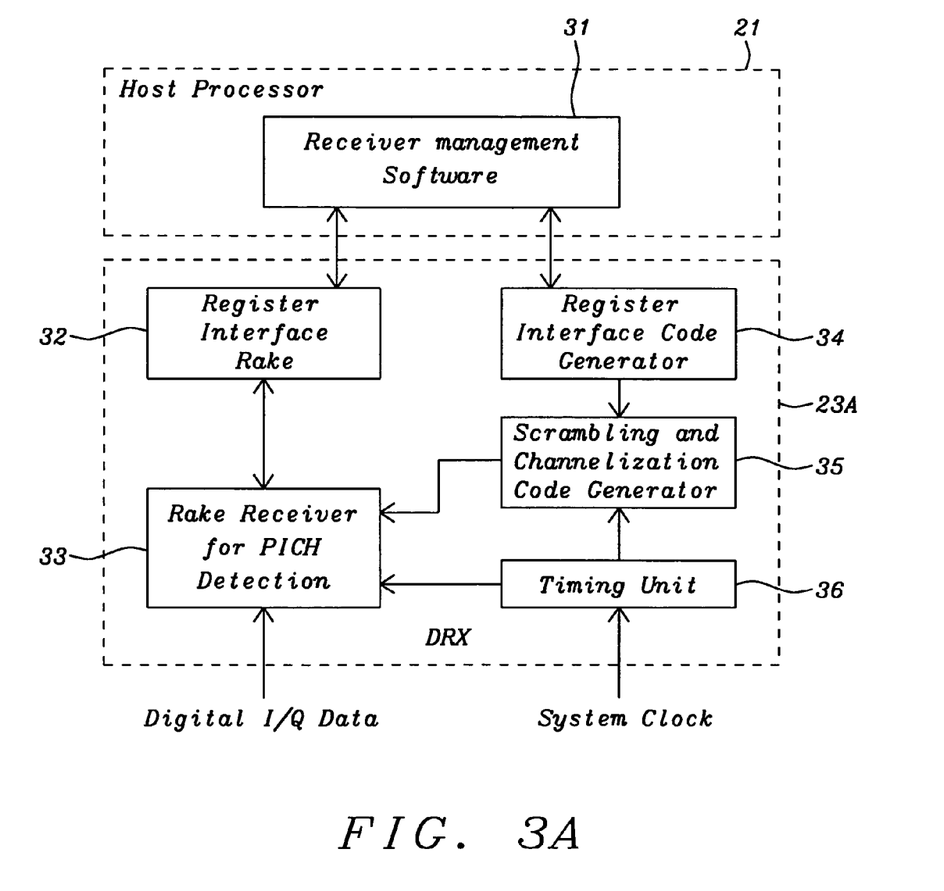
FIG. 3A is a block diagram of the DRX unit used in the first embodiment of the present invention for discontinuous reception of a PICH signal in idle mode.

In FIG. 3A is a block diagram of the DRX unit 23 (FIG. 2) of the first embodiment of the present invention (where 23A is the version of the DRX used of the first embodiment). In the first embodiment the DRX unit 23A does not require an internal search engine since the host processor 21 provides synchronization of the DRX unit based on the modem search report from the search function 25. The host processor is in a low power standby mode (partially active in terms of power consumption) to provide control to the modem 22 and the DRX unit 23A. The RFTRX 24, DRX 23A and the modem 22 are partially active in terms of duty cycle and become fully active during a paging occasion.

Shown in FIG. 3A, the receiver management software 31 registers the interface rake 32 and the interface code generator 34 with the WCDMA network after which the DRX unit 23A enters an idle mode waiting for a page occasion and the receipt of a paging bit on the PICH channel from the digital I/Q data. When a paging bit is received by the rake receiver 33, the paging bit is coupled to the receiver management software 31 in the host processor 21. A system clock is coupled to a timing unit 36 within the DRX 23A, and the timing unit 36 distributes timing information to the rake receiver 33 and the scrambling and channelization code generator 35.

The scrambling and channelization code generator 35 is connected to the rake receiver 33 in the DRX 23A to unscramble and un-spread a WCDMA signal, which for bandwidth and noise purposes has been spread by a base station over a wide band of signal frequencies. A spreading code is used to spread a narrow band user signal over the WCDMA bandwidth where every physical channel transmitted by a base station uses a different spreading code. All spreading codes used by a base station are mutually orthogonal to minimize interference between the physical channels. Once a narrow band user signal has been spread, the signal is then multiplied with a scrambling code, where different base stations uses different scrambling code to minimize interference between different signals from different base stations. To demodulate a received signal a WCDMA device must unscramble and un-spread the wideband transmission from the base station into a narrow band signal.

Figure 3B:
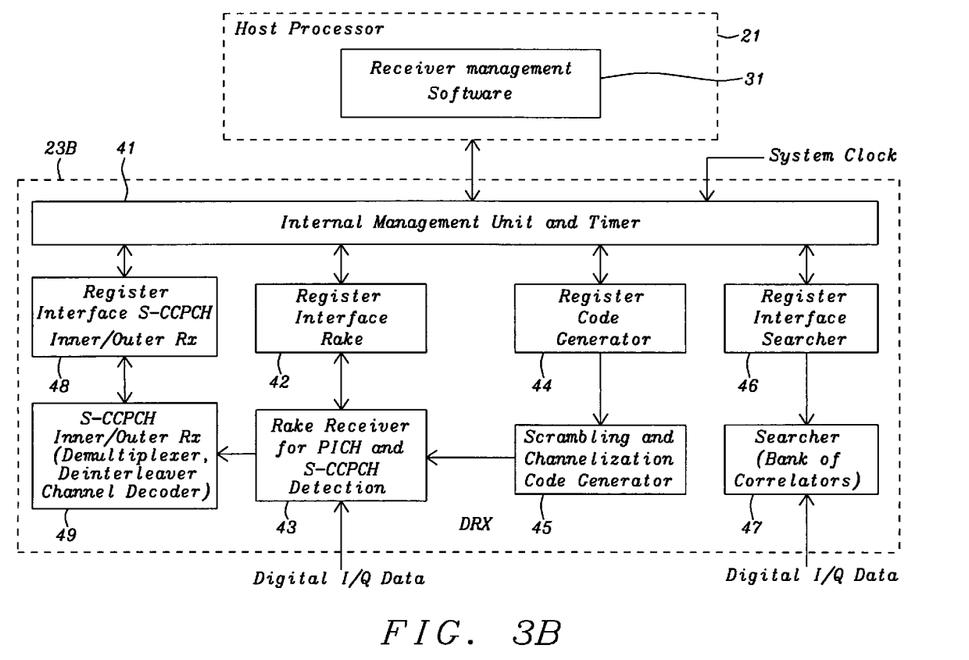
FIG. 3B is a block diagram of the DRX unit used in the second embodiment of the present invention for autonomous discontinuous reception of network signals in idle mode.

In FIG. 3B is shown a second embodiment of the present invention where the functions of a WCDMA device are in idle mode and where the DRX unit 23B operates autonomously and contains internal timing and a search engine to perform a search function to detect incoming network messages. The WCDMA device is powered up, activating the host processor 21, the RFTRX unit 24, the DRX unit 23B and the modem 22. The host processor configures the DRX unit 23B to detect PICH and S-CCPCH signals, where 23B is the version of the DRX used in the second embodiment.

Continuing to refer to FIG. 3B, the host processor 21, the RFTRX unit 24 enters a partial active mode and the modem 22 enters a sleep mode to conserve power. When the DRX 23B detects a paging occasion by detecting a PICH signal, the DRX unit 23B awakens the RFTRX unit 24. If there are S-CCPCH signals, the DRX unit 23B demodulates the S-CCPCH signals, wakes up the host processor 21 and hands over to the host processor the paging message. The DRX 23B contains a search engine and capability to process the S-CCPCH signals as well as the capability to handle PICH and S-CCPCH signal autonomously. The DSP (digital signal processor) in the modem 22 containing the search function 25 is only required if demodulation of channels other than the PICH and the S-CCPCH are required and remains asleep until that need arises. The host processor 21 may need to remain partially active to manage tasks other than paging events during idle mode caused by complexity of the S-CCPCH signal processing such as multi-rate rake that occurs at a data rate different than PICH signals and a secondary channel that uses channel encoding.

The rake receiver is the classical receiver in CDMA (Code Division Multiple Access). Each "finger" of the rake receiver is assigned to one resolvable propagation path of the signal. The propagation path is a version of the transmitted signal associated with a certain delay and attenuation. In CDMA the narrow band user signal is spread over a relatively large bandwidth. The employed spreading factor describes the bandwidth ratio after and before spreading of the user signal.

Some common channels in WCDMA use a fixed spreading factor (e.g. the PICH). The corresponding rake receiver uses de-spreading at a fixed rate. The S-CCPCH features variable spreading factors, thus the corresponding rake receiver needs to be capable of performing de-spreading at multiple spreading factors (multi-rate rake). Some channels (typically the ones that carry only layer 1 information e.g. PICH) carry un-coded information. Other channels (typically the ones that carry higher layer data and control information e.g. S-CCPCH) use channel encoding for improved data protection. To fully process the data of such a channel an additional receiver module called channel decoder is required.

In FIG. 3B is shown the DRX 23B for the second embodiment of the present invention. The host processor 21 containing receiver management software 31 is coupled to an internal management unit and timer function 41 contained within the DRX 23B. The system clock is also coupled to the internal management unit and timer 41. The host processor 21 registers with the WCDMA network the functions of the DRX 23B through the various register interfaces, e.g. register interface SCCPCH outer/inner Rx 48, Register interface rake 42, register code generator 44 and register interface searcher 46.

Continuing to refer to FIG. 3B, when the DRX 23B detects a paging occasion by detecting a PICH signal, the DRX unit 23B receives a paging bit from the digital I/Q data coupled to the rake receiver for PICH and S-CCPCH detection 43 and awakens the RFTRX unit 24. If there are S-CCPCH signals, the S-CCPCH inner/outer receiver function 49 demodulates the S-CCPCH signals, wakes up the host processor 21 and hands over to the host processor the paging message. The DRX 23B contains a search engine 47 (searcher with a bank of correlators) coupled to the digital I/Q data that allows the DRX 23B to detect various portions of the S-CCPCH signal spread over several mega hertz of signal bandwidth and provides the capability to process the S-CCPCH signals as well as the capability to handle PICH and S-CCPCH signal autonomously. Continuing to refer to FIG. 3B, a scrambling and channelization code generator 45 is coupled to the rake receiver 43 and the searcher 47 to unscramble and un-spread a WCDMA signal, which for bandwidth and noise purposes has been spread by a base station over a wide band of signal frequencies. The S-CCPCH inner/outer Rx (receiver) 49 converts a signal received from the antenna of a WCDMA device into generic data packets. In the WCDMA device receiver the signal can be divided into "inner receiver" and "outer receiver". The tasks of inner receiver in WCDMA device system comprise synchronization unscrambling and un-spreading of the received signal. The tasks of outer receiver in WCDMA comprise de-multiplexing and channel de-coding.

Figure 3C:
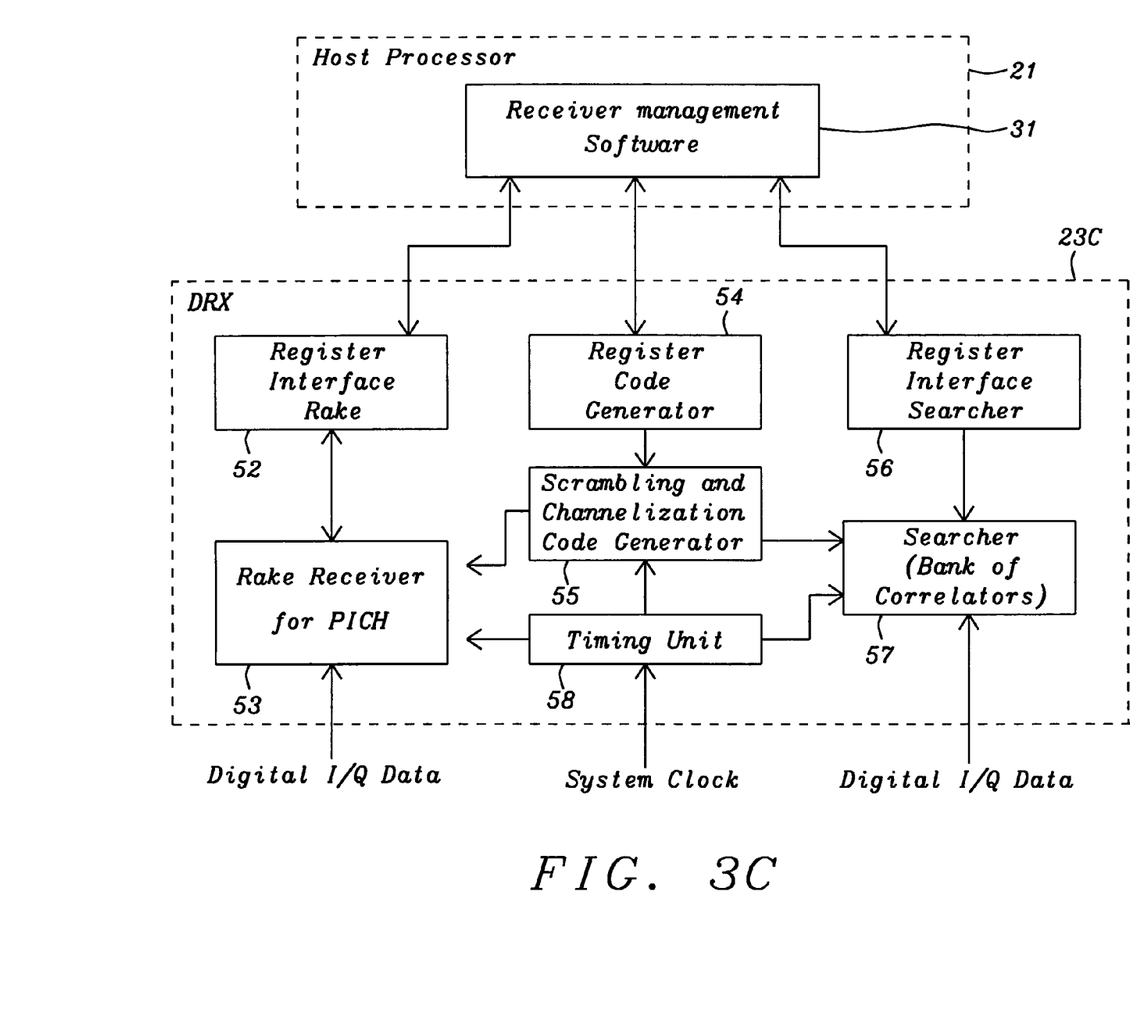
FIG. 3C is a block diagram of the DRX unit used in the third and fourth embodiment of the present invention for discontinuous reception in idle mode managed by a host processor.

Referring to FIG. 3C, in a third embodiment of the present invention a discontinuous reception of a PICH signal is performed in an idle mode. The WCDMA device 20 is powered up and the host processor 21, the RFTRX unit 24, the DRX unit 23C and the modem 22 are active to obtain system information and the register with the cellular network, where 23C is the version of the DRX used in the third embodiment. The RFTRX unit 24 and the DRX unit 23C enter a partial active mode and the modem 22 goes to a sleep state after registration is completed. Upon a paging occasion the host processor 21 awakens the RFTRX unit 24 and the DRX unit 23C. The RFTRX unit and the DRX unit are in partially active state and are only fully active during the paging occasion.

Continuing to refer FIG. 3C, the host processor 21 configures the DRX unit 23C to detect PICH signals. When detecting PICH signals the DRX 23C needs to know synchronization information, such as the exact timing of the paging indicator bit (i.e. ID of the paging indicator bit within the relevant paging occasion), the scrambling code number used by the network, the spreading code number and the timing of propagation paths obtained from searcher 57. The DRX unit 23C upon detecting a paging indicator communicates the paging indicator signal, PICH, and a channel delay profile signal to the host processor 21, whereupon the host processor awakens the modem 22 for reception of an incoming paging message, making use of the synchronization information from the DRX unit 23C. The channel delay profile signal provides a snapshot of the search signal, resolvable versions, timing reports and power of each signal that can be resolved. The host processor runs in a power saving partially active mode, but remains in charge of managing the peripheral devices and transitions between different modes of the WCDMA device 20.

Continuing to refer to FIG. 3C, the receiver management software 31 in the host processor 21 is couple to the register interface rake 52, register code generator 54 and register interface searcher 56 to register the interface rake 53, the scrambling and channelization code generator 55, and the searcher 57 with the WCDMA network after which the DRX 23C enters an idle mode waiting for a paging occasion. The connection between the receiver management software 31 and the register interface rake 52 provides a path by which results from the rake receiver 53 are communicated to the host processor, and the connection between the receiver management software 31 and the register interface searcher 56 provides a path by which searcher 57 communicates search results back to the host processor. The scrambling and channelization code generator 55 is connected to both the rake receiver 53 and the searcher 57. Both the rake receiver 53 and the searcher 57 receive input from the digital I/Q data. A timing unit 58 distributes timing information based on the system clock to the rake receiver 53, the scrambling and channelization code generator 55 and the searcher 57.

Continuing to refer to FIG. 3C, in the fourth embodiment of the present invention the WCDMA device 20 performs cell monitoring in an idle mode. The host processor 21 awakens the DRX unit 23C to perform a cell monitoring event where the DRX unit 23C monitors the environment of nearby cells within the WCDMA network using the searcher function 57 in the DRX unit. The RFTRX and DRX are active during a paging occasion or during cell monitoring, and asleep otherwise. The software running on the host processor manages cell monitoring, and the host processor uses an internal timer relative to which the software triggers cell monitoring events. The frequency of the cell monitoring depends on the software that is running on the host processor and the environment in which the WCDMA device is moving form location to location.

Figure 3D:
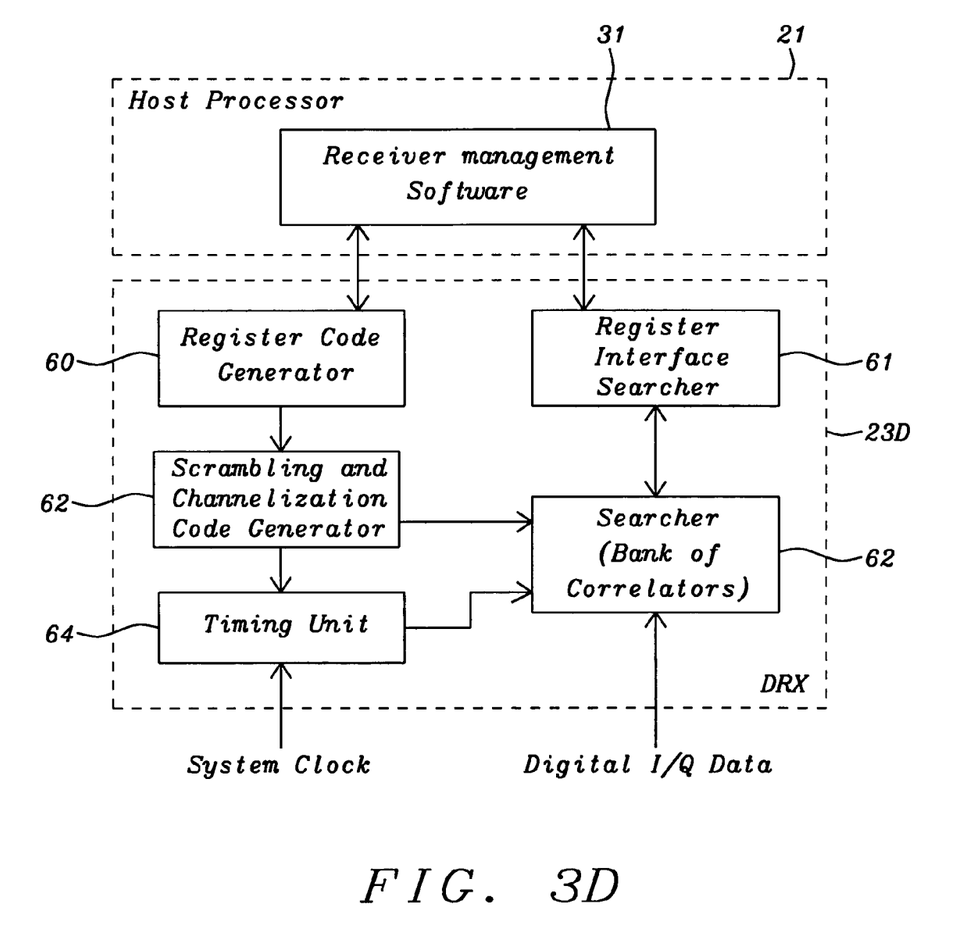
FIG. 3D is a block diagram of the DRX used in the fifth embodiment of the present invention unit for cell monitoring in active mode.

Referring to FIG. 3D, in a fifth embodiment of the present invention the WCDMA device 20 is active and powered up. The host processor 21 has registered with the WCDMA network the scrambling and channelization code generator 62 from the receiver management software 21 through connections to the register code generator 60, and in like manner the host processor has registered the searcher 63 with the WCDMA network through connections with the register interface searcher 61. The searcher 63 is coupled to the digital I/Q data provided by the RFTRX unit 24. The system clock is connected to the timing unit 64 for distribution of timing signals to the scrambling and channelization code generator 62 and the searcher 63. After registration the DRX unit 23D is placed in an idle state Continuing to refer to FIG. 3D, the host processor 21 awakens the DRX unit 23D to perform a cell monitoring event where the DRX unit monitors the environment of nearby cells within the WCDMA network using the searcher function 63. The DRX unit is active during cell monitoring, and asleep otherwise. The software running on the host processor manages cell monitoring using an internal timer relative to which the software triggers cell monitoring events. The frequency of the cell monitoring depends on the software that is running on the host processor and the environment in which the WCDMA device is moving form location to location.

Continuing to refer to FIG. 3D, the WCDMA device 20 is powered up, and the host processor 21, the RFTRX 24 and the modem 22 are activated into a full operational state. System information has been collected and the WCDMA device has been registered with a cellular network. The host processor 21 awakens the DRX unit 23D to perform a cell monitoring event where the DRX unit 23D monitors the environment of nearby cells within the WCDMA network using the searcher function 63 in the DRX unit. The RFTRX unit 24 is configured by the host processor for reception of an active carrier while monitoring other carriers in a compressed mode. The DRX unit 23D does not read PICH signals because the WCDMA device is powered up and in connected mode. The host processor 21 configures the DRX unit 23D to search on a P-CPICH (primary common pilot indicator channel) and communicate to the host processor the channel delay power profile, which provides a snapshot of the network service. The use of the DRX unit 23D in a connected mode allows a searcher 63 within the DRX to perform searches of nearby cells of the WCDMA network thereby reducing the load on the search function 25 located in the modem 22 (FIG. 2). The activity of the DRX unit 23D when the WCDMA device is in active mode supports the other functions in the WCDMA device in which it complements the overall search capacity of the WCDMA device thereby enhancing receiver performance during a connected mode.

Figure 4:
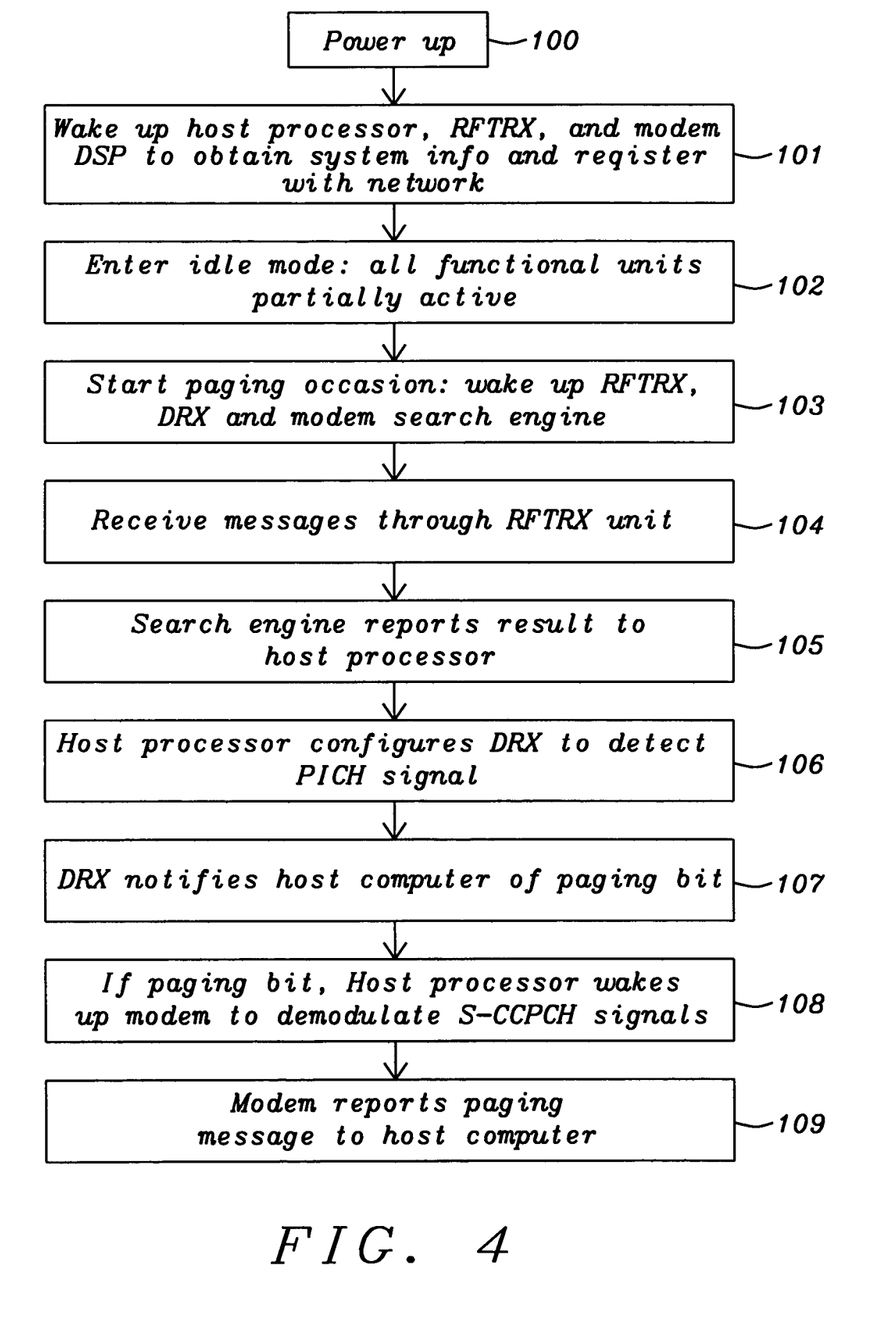
FIG. 4 is a flow diagram of a method of the present invention in an idle mode using a modem DSP search engine.

In FIG. 4 is shown a flow diagram for the first embodiment of the present invention for an idle mode of the WCDMA device 20 where the WCDMA device is initially powered up 100, and all the units of the WCDMA device are awakened to obtain system information and to register with the WCDMA network 101. The host processor 21 and the peripheral units comprising the DRX unit 23, the RFTRX 24 and the modem 22 enter an idle mode are all units placed into a partial active state 102. At the start of a paging occasion the host processor 21 wakes up the DRX 23 the RFTRX unit 24 and the search function 25 of the modem 22 to an active state 103. A message is received through the RFTRX unit 104, coupled to the modem, and the modem search engine reports a search result to the host processor 105. The Host processor configures the DRX to detect a PICH signal 106. The DRX notifies the host processor of a paging bit 107 that indicates that there is or is not a message, and if the appropriate paging bit is received the host processor awakens the modem from a partial active state to demodulate an S-CCPCH signal 108. The modem then reports the paging message to the host processor 109.

Figure 5:
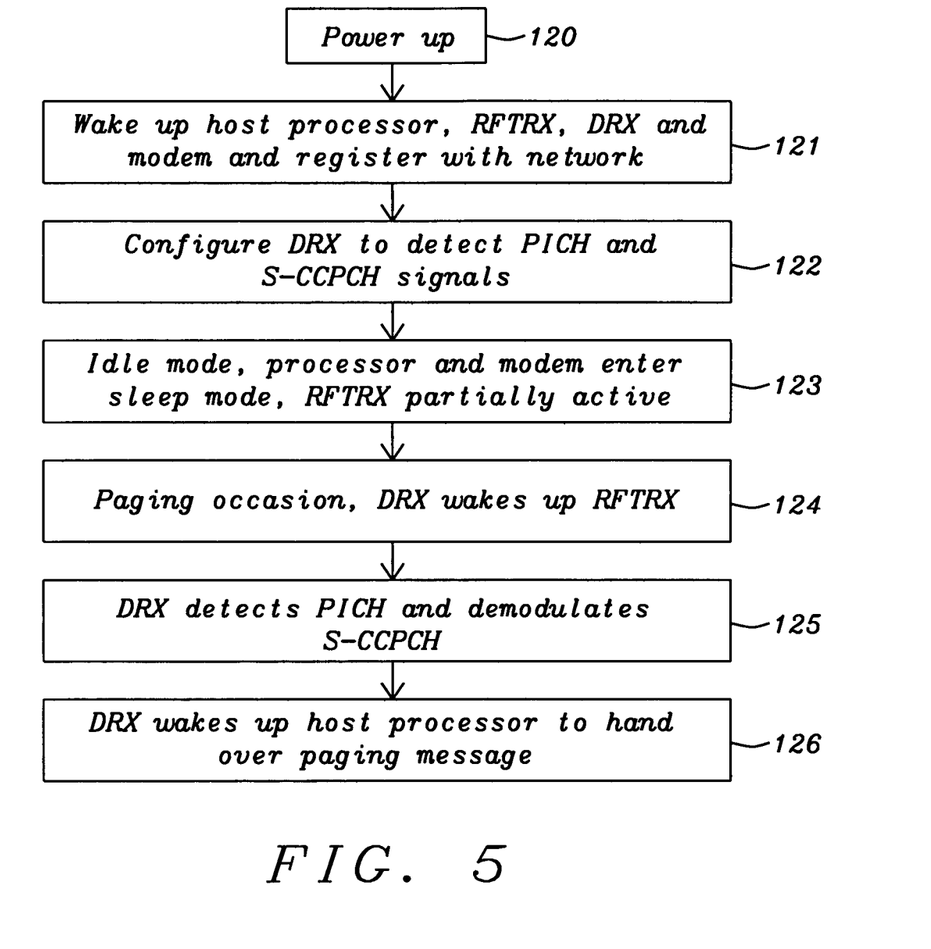
FIG. 5 is a flow diagram of a method of the present invention in idle mode using the DRX to detect an incoming signal and wakes up appropriate functions within the WCDMA device.

In FIG. 5 is shown a flow diagram for the second embodiment of the present invention for an idle mode of the WCDMA device 20 for discontinuous reception of PICH signals. The WCDMA device is initially powered up 120. The host processor 21, the RFTRX 24, the DRX 23 and the modem 22 are awakened 121 into an active state to obtain system information and to register the WCDMA device with a cellular or mobile network. The host processor configures the DRX to autonomously detect PICH and S-CCPCH signals 122. The host processor and the modem enter a sleep mode while the DRX remains active and the RFTRX is partially active 123. On a paging occasion the DRX wakes up the host processor, which changes to an active state 124. The DRX detects a PICH signal, and if the proper paging bit is received, the DRX demodulates S-CCPCH signals 125 and wakes up the host processor to hand over the paging message 126. The modem is only required to power up from the sleep state if demodulation of other than the PICH and the S-CCPCH signals are required.

Figure 6:
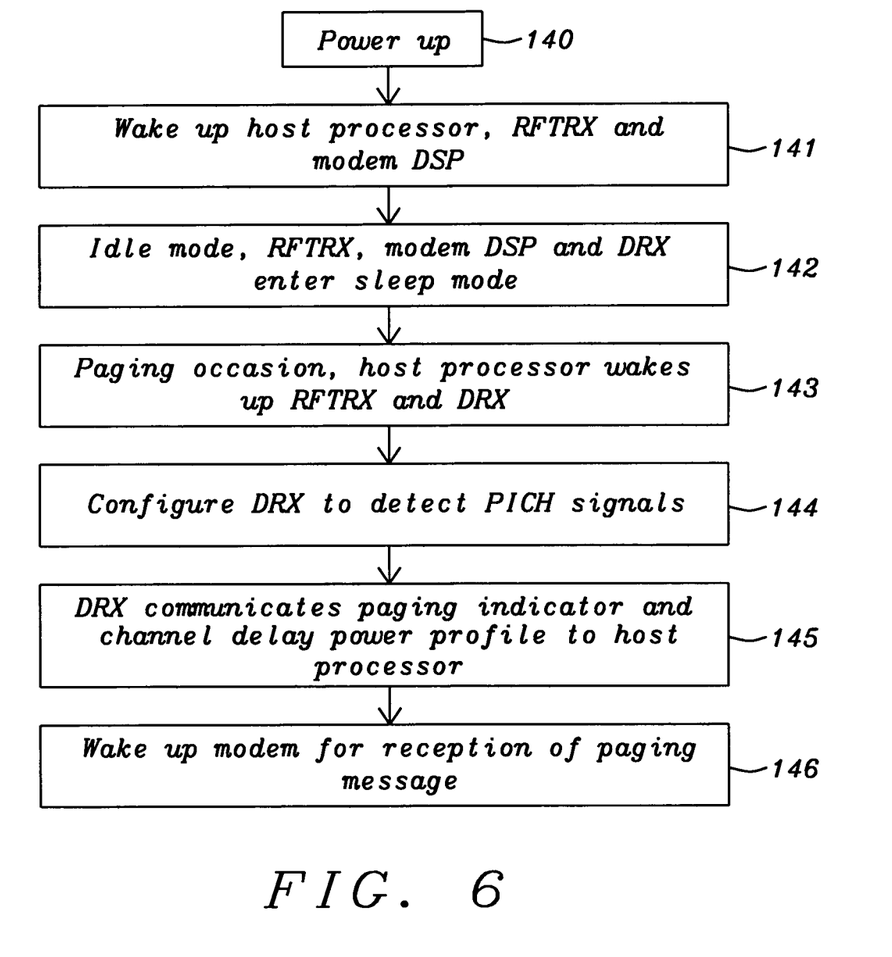
FIG. 6 is a flow diagram of a method of the present invention in an idle mode managed by the host processor.

In FIG. 6 is shown a flow diagram for the third embodiment of the present invention for an idle mode of the WCDMA device 20 where the DRX 23 has an internal search engine and is managed by the host processor. The WCDMA device is initially powered up 140. The host processor 21, the RFTRX 24, the DRX 23 and the modem 22 are awakened 141 into an active state to obtain system information and to register the phone with a cellular network. The RFTRX, modem and DRX are idled into a sleep mode 142. For a paging occasion the host processor wakes up the RFTRX and the DRX units 143, which are placed into a partial active state. The RFTRX and the DRX are only active during and for a short period prior to the paging occasion to allow for synchronization.

Continuing to refer to FIG. 6, the host processor configures the DRX unit to detect a PICH signal 144 and the DRX couples a paging indicator and a channel delay power profile to the host processor 145. The channel delay power profile provides a snapshot of the network service, comprising resolvable versions of signals timing and power of each resolvable version of the signal. If the appropriate paging indicator is received, the host processor wakes up the modem into an active state to receive a paging message 146. In this embodiment the host processor can be run in power saving mode, for example partial active mode, but remains in control of managing the peripheral units (RFTRX, DRX and modem) and the transitions between modes.

Figure 7:
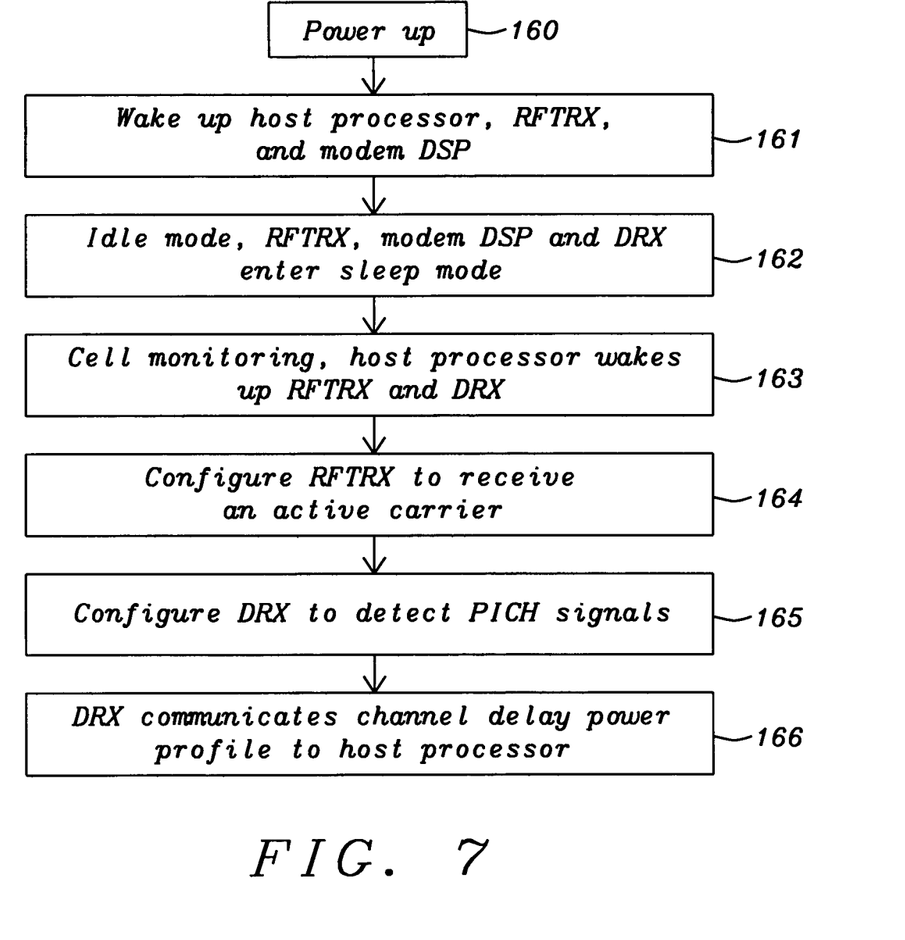
FIG. 7 is a flow diagram of a method of the present invention for cell monitoring in idle mode.

In FIG. 7 is shown a flow diagram for the fourth embodiment of the present invention for cell monitoring in an idle mode of the WCDMA device 20. The WCDMA device is initially powered up 160. The host processor 21, the RFTRX 24, the DRX 23 and the modem 22 are awakened 161 into an active state to obtain system information and to register the WCDMA device with a cellular network. The RFTRX, DRX and modem are placed into an idle mode in which these units power down in a sleep mode 162. At the occurrence of a cell monitoring event, the host processor wakes up the RFTRX and DRX units 163. The host processor configures the RFTRX unit to receive an active carrier 164, and configures the DRX to search for a P-CPICH signal 165 using a search function internal to the DRX unit. The DRX communicates the channel delay power profile to the host processor 166.

Figure 8:
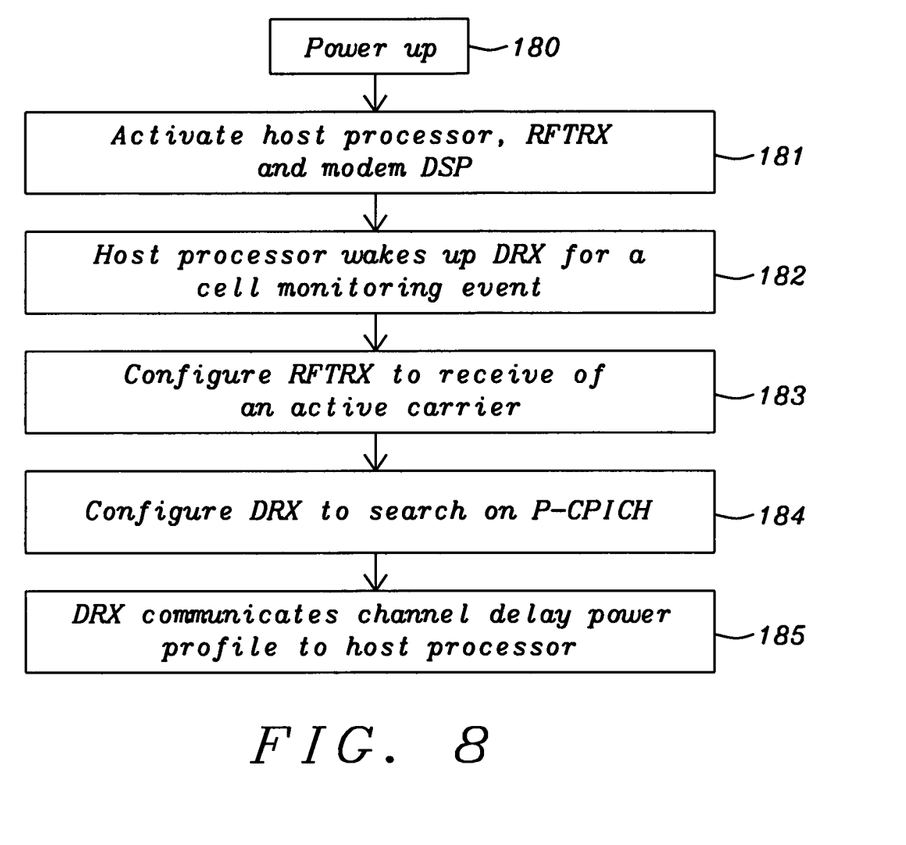
FIG. 8 is a flow diagram of a method of the present invention for cell monitoring in a connected mode.

In FIG. 8 is shown a flow diagram for the fifth embodiment of the present invention for cell monitoring in a connected mode of the WCDMA device 20. The WCDMA device is powered up 180, and the host processor 21, the RFTRX 24 and the modem 22 are activated 181 into a full operational state. System information has been collected and the WCDMA device has been registered with a cellular network. The host processor awakens the DRX unit to perform a cell monitoring event 182 where the DRX monitors the environment of nearby cells within the WCDMA network using a search function in the DRX unit. The RFTRX unit is configured by the host processor for reception of a desired carrier 183 while monitoring other carriers in a compressed mode. The DRX unit is not needed to read PICH signals because the WCDMA device is powered up and in connected mode. The host processor configures the DRX unit to search on a P-CPICH channel 184 and the DRX communicates to the host processor the channel delay power profile 185, which provides a snapshot of the network service. The use of the DRX unit in a connected mode allows a search function within the DRX to perform searches of nearby cells of the WCDMA network and thereby reducing the load on the search function located in the modem. The DRX activity when the WCDMA device is in active mode supports of the other functions in the WCDMA device in which it complements the overall search capacity of the WCDMA device and enhances receiver performance during a connected mode.

While the invention has been particularly shown and described with reference to preferred embodiments thereof, it will be understood by those skilled in the art that various changes in form and details may be made without departing from the spirit and scope of the invention.

What is claimed is:

1. A method of discontinuous reception in a communication device, comprising:
    powering up the device;
    waking up functional units of the device to obtain system information and register with a network;
    entering the functional units of the device into an idle mode;
    starting a paging occasion;
    receiving network signals through a radio frequency (RF) unit;
    reporting search function results to a host processor of the device;
    configuring a discontinuous receiver (DRX) to detect paging indicator channel (PICH) signals while a modem is in the idle mode;
    notifying the host processor of a paging bit received on the PICH that indicates whether there is a message by the DRX;
    waking up the modem from the idle mode, when the paging bit received on the PICH indicates there is a message, to demodulate second common control channel (S-CCPCH) signals; and
    coupling a paging message from the modem to the host processor.

2. The method of claim 1, wherein the functional units comprise the host processor, the RF unit, the DRX, and the modem.

3. The method of claim 1, wherein starting the paging occasion wakes up from the idle mode the RF unit, the DRX unit, and a search function of the modem.

4. The method of claim 1, wherein the paging bit indicates a message to be downloaded.

5. A communication device comprising:
a radio frequency (RF) unit configured to transmit and receive RF signals;
a modem configured to demodulate second common control channel (S-CCPCH) signals;
a host processor configured to provide synchronization based on a search report from the modem, and upon notification of a paging bit that indicates there is a message, to awaken the modem from an idle mode to demodulate the S-CCPCH signals, the host processor being separately coupled to the RF unit and the modem; and
a discontinuous receiver (DRX) unit, coupled to the RF unit, the modem, and the host processor, comprising:
a rake receiver that detects a paging bit upon a paging occasion while the modem is in the idle mode, and that couples the paging bit to the host processor, and
a scrambling and channelization code generator, connected to the rake receiver, that unscrambles and unspreads a paging indication channel (PICH) signal containing the paging bit.

6. The communication device of claim 5, wherein the rake receiver and the scrambling and channelization code generator are in the idle mode prior to a paging occasion.

7. The communication device of claim 5, wherein the paging occasion is timed by internal counters within the host processor to wake up portions of the device to detect incoming messages.

8. A communication device, comprising:
means for powering up the device;
means for waking up functional units of the device to obtain system information and register with a network;
means for entering the functional units of the device into an idle mode;
means for starting a paging occasion;
means for receiving network signals through a radio frequency (RF) unit;
means for reporting search function results to a host processor of the device;
means for configuring a discontinuous receiver (DRX) to detect paging indicator channel (PICH) signals while a modem is in the idle mode;
means for notifying the host processor of a paging bit received on the PICH that indicates whether there is a message by the DRX;
means for waking up the modem from the idle mode, when the paging bit received on the PICH indicates there is a message, to demodulate second common control channel (S-CCPCH) signals; and
means for coupling a paging message from the modem to the host processor.

* * * * *